United States Patent Office 3,281,515
Patented Oct. 25, 1966

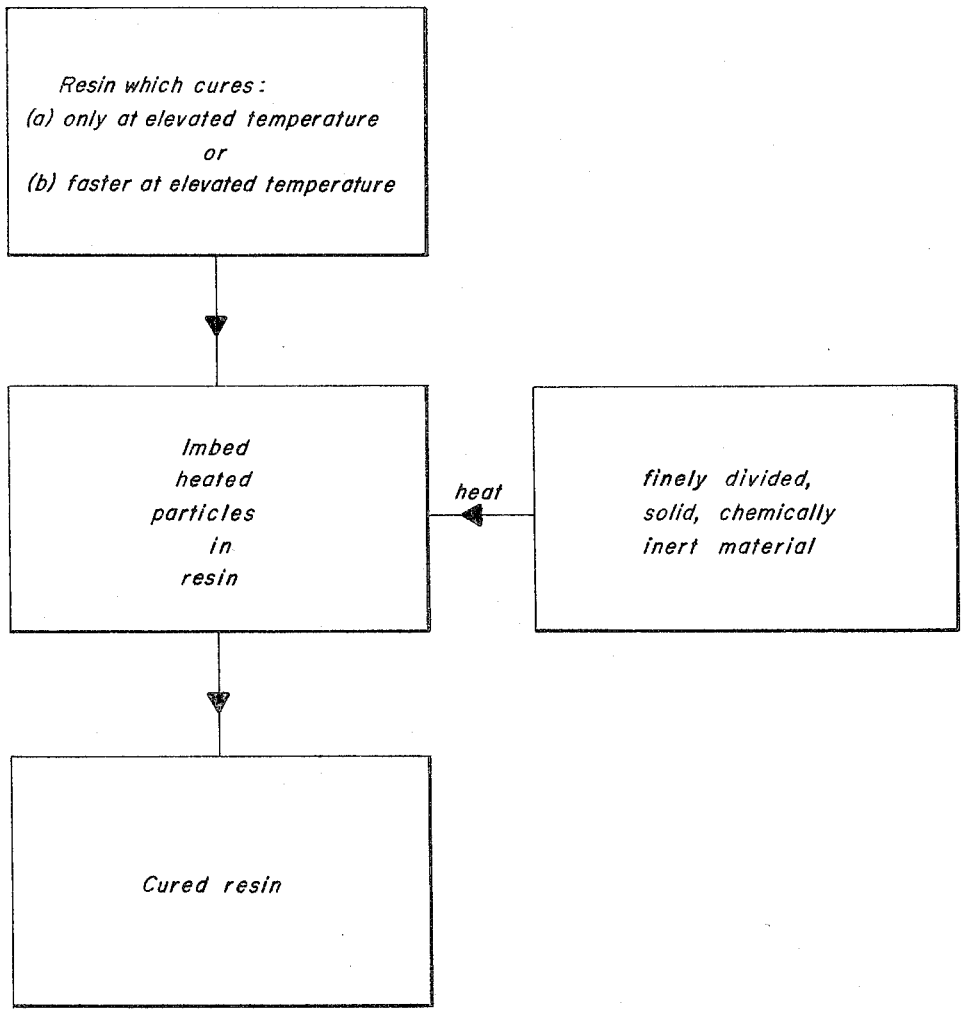

3,281,515
RESIN CURING
Robert D. Schmitz, Burlingame, Calif., assignor to Hodges Chemicals Company, a corporation of California
Filed Jan. 31, 1963, Ser. No. 255,179
12 Claims. (Cl. 264—236)

This invention relates to a method of curing a resin and more particularly relates to curing a resin wherein the cure is initiated or accelerated by heat supplied by applying to the resin small heated particles of a chemically inert substance.

Many resin systems are used industrially in applications wherein it is desirable to accelerate the cure of the resin by the application of heat, while other resin systems require the application of heat in order to cure the resin. In many instances it is impractical to heat the article directly, as the article may have been treated so that it is desirable to supply the heat in some other manner. For instance, in preparing resin-coated wood panels, the wood is a poor conductor of heat and it would be difficult to heat the panel to hasten the cure. Further, the wood might char if it were heated to a temperature high enough to initiate or materially increase the rate of cure. In other instances, such as when resins are used as paving materials, it would be completely impractical to attempt to heat the substrate to hasten or initiate the resin cure. In still other instances such as in the manufacture of molded articles, and particularly articles having a thick cross section, it is difficult to heat the resin in a uniform manner.

In accordance with the present invention, it has been found that a resin can be cured and/or that the cure time of the resin can be materially decreased if the resin is treated with small heated particles of a solid material. This is highly advantageous from several standpoints. If a purely industrial process is being carried out wherein wood, glass or metal panels are being coated with a resin, the process time can be greatly decreased. In other instances, the utility of the resin is greatly increased since if a highway is being treated with a resin, it may be out of service for long periods of time if the resin is allowed to cure at ambient temperature. This is particularly true when a relatively thick layer is being applied.

In addition to causing the cure or decreasing the cure time, the use of the particulate matter in coating applications has certain other advantages. In many instances, particles can be such that they give a decorative textured surface to the material being treated. In other instances, particles contribute to the wear resistance and anti-skid resistance of the treated substrate. The cost of a coating of a given thickness is decreased since the particles are ordinarily less expensive than the resin. Light reflective materials can be used which are only partially embedded in the resin, such as light colored pigments and reflective glass beads, so that the invention is one of high utility in forming traffic strips and traffic warning markings of various kinds. In other instances, such as in the making of castings, the particulate matter may contribute to the strength and/or wear resistance of the finished article.

The particles which can be employed may be ordinary sand or gravel or can be any other material which is capable of conveying heat to the resin and which does not adversely react chemically therewith. Thus, in addition to sand and gravel, glass chips, ceramic particles, marble or limestone chips, roofing granules, metal turnings, filings or spheres, reflective glass beads and the like can be employed.

In some instances, the particulate material is merely sprinkled onto the surface of a freshly coated resin article. In other instances, the particles are applied with force, such as through conventional sandblasting equipment, which is particularly valuable when a thick resin coating is to be treated or when the surface is vertical. In some instances, it is practical to cover the surface to be coated with the heated particles and then apply the resin over the particles. In the making of castings, a mold may be filled with heated particles and the liquid resin poured in or the mold may first be partly filled with the liquid resin and the heated particles then poured into the mold.

It has been found that the particle size is not critical and that various sizes of solid material can be used. However, the material should not be in the form of fine powder since it might drift rather than entering the surface of the resin, would tend to cool unduly on the contact of air, and would be difficult to wet with the resin.

For the purpose of the present invention, resin systems which may be cured in accordance with the present invention have been classified as follows:

*Type I.*—Systems which will normally cure at room temperature, but can be accelerated with heat.

*Type II.*—Reactions which essentially take place only at elevated temperatures.

*Type III.*—Elevated temperatures cause a reaction (usually decomposition or dissociation) which releases a reactive agent, which in turn reacts with the resin. Here, of course, the reactive agent itself may be the resinous backbone and may comprise the majority of the film.

*Type IV.*—A physical change takes place at elevated temperatures (melting, solvating, etc.).

The sole figure of the drawing is a flow diagram illustrating the method of carrying out the present invention.

The following working examples illustrate various embodiments of the invention.

Examples 1 and 2 are typical of the Type I system and in these examples a resin and catalyst were used made up as follows:

RESIN

| Parts by Weight | Ingredient | Nature | Function |
| --- | --- | --- | --- |
| 100 | Epon 828 | Diglycidylether of bisphenol-A | Epoxy Resin (reactive base). |
| 5 | Beetle 216-8 | Urea formaldehyde resin solution | Leveling Aid. |
| 4.5 | Bentone 38 | Bentonite clay | Thixotroping Agent. |
| 1 | Modepox | Triphenyl phosphate | Accelerator. |
| 26.5 | Titanox RA-50 | Titanium Dioxide Pigment | White Pigment. |
| .3 | Mistron HGO-75 | Talc Pigment | Inert Pigment. |

CURING AGENT

Ingredient: Parts by Weight
    Epon Curing Agent U _____ 25
    Dow Curing Agent QXZ 654.1 _____ 27
    Gersamide 125 _____ 8.6
    DMP 30 [1] _____ 0.2

[1] All but DMP are primary and secondary amine resinous curing agents which react with and cross link the epoxy resin. DMP 30 is an accelerator.

In each instance, thirty-five parts of the resin were used with 6.5 parts of the curing agent.

*Example 1.*—The resin and curing agent were mixed in the proportion stated above and a plywood panel was immediately coated to a thickness of 0.016 inch. The film was immediately covered with No. 4 sandblasting sand heated to 300° F. The sand was applied approximately ¼ to ½ inch thick. After standing five minutes the film was set and it was impossible to pry the coarse sand loose from the panel. When a second piece of plywood was placed over the treated plywood and the weight of about 150 pounds applied and the second piece twisted, the aggregate did not move.

*Example 2.*—The above experiment was repeated except that the sand was heated to 250° F. Here the coating set hard in ten minutes and the aggregate could not be moved when subjected to twisting under a second piece of plywood as was noted in Example 1. A control panel was treated in exactly the same manner except that the sand was at room temperature (67° F.) and was still soft after two hours; after three hours the material was beginning to set but could still be moved and even after four hours the sand could be pryed out of the panel.

In the above examples, the sand was No. 4 sandblasting sand of which 72% is 18 to 8 mesh, 27% is ¼ to ³⁄₁₆ inch in diameter and 1% is less than 18 mesh. When the experiments were repeated using No. 2 sandblasting sand, most of which passes through an 18 mesh screen, the results were substantially the same.

*Example 3.*—The following example also represents a Type I system. In this system, a polyester resin mixture was made in accordance with the composition set forth in Table I. The resin base and initiator were mixed in the proportions stated in the table and a plywood panel was coated to a thickness of approximately 0.015 inch. The film was immediately covered with No. 4 sandblasting sand heated to 280° F. A thermocouple wire stapled to the plywood panel showed that the temperature of the plastic near the surface of the plywood rose almost immediately to 204° F. In 17 minutes, the resin had cured to a hard mass and the temperature was down to 110° F. A control film of the same material applied in the same manner but without the heated sand was still soft after three hours.

*Examples 4 and 5.*—The following two examples are of Type II systems. A high molecular wight hydroxyl-containing epoxy resin mixed with a phenol-formaldehyde resin and hexamethoxymethylmelamine was employed. The epoxy resin was employed to function as a high molecular weight polyol rather than as an epoxy. It is believed that the cure mechanism is a polyether formation between the hydroxyl groups of the epoxy resin and the methylol or methylated methylol groups. The compositions of the two examples are given in Tables II and III. In each instance, a film of the resin was cast on glass at room temperature to give a film thickness of about 0.015 inch. The solvents were allowed to evaporate and then the coatings were covered with hot No. 4 sandblasting sand. The initial temperature in each instance, measured by thermocouple, was 400° F. and in 20 minutes the temperature had gone down to 194° F., at which time both systems were cured.

*Examples 6 and 7.*—These examples are typical of the Type III systems, and in one case an epoxy resin was cured with dicyandiamide and in the other with boron trifluoride monoethylamine. The compositions are set forth in Tables IV and V and in each instance a film 0.015 inch was cast on glass and heated sand applied thereto. Both of these systems were successfully cured, reaching an initial temperature of 560° F. Control panels were also made up, but without sand, and the controls were still fluid after two weeks.

*Example 8.*—A further example of a Type III cure is the use of a phenol blocked isocyanate prepolymer to cure a hydroxyl-containing epoxy resin. The ingredients of the system are set forth in Table VI. Two films of the mixture on glass were made, giving an initial film of 0.006 inch which in theory should give a dry ultimate film of 0.002 inch. On the first film, reflective glass beads were sprinkled which were at room temperature. Both films were then allowed to dry at room temperature for two days with no evidence of curing. The second film was then sprinkled with heated reflective glass beads having a temperature of about 500° F. After 16 minutes, the film was fully cured. The film which had been treated with glass beads at room temperature was then immersed in toluene for 10 minutes, whereupon it became very soft. The film which had been cured with the reflective glass beads was immersed in toluene for 48 hours and was not as soft as the film which had been immersed in toluene for 10 minutes.

*Example 9.*—A plastisol of polyvinyl chloride is a typical example of a Type IV system. The compositon used is set out in Table VII. Two films 15 mils thick were formed, one on glass and one on plywood. Both films were covered with hot aggregate at a temperature of about 400° F. After 10 minutes, the temperature had dropped to 208° F. and both films were fully cured.

Preferably, the solid material should be heated to a temperature of at least 200° F. since at lower temperatures the decrease in curing time is insufficient to ordinarily make the process worthwhile. Generally speaking, higher temperatures are preferred but if the substrate is plywood or a similar material which tends to gas or char when heated, the temperature should be held to a maximum of 350° F. because at temperatures much above this, gassing occurs and causes small bubbles in the film. If the substrate is one which does not gas, such as metal or glass, the temperature can be substantially higher than this and can be any temperature which is not high enough to chemically char the plastic.

TABLE I.—COMPOSITION OF POLYESTER FILM

| Ingredient | Parts by Weight | Nature | Function |
|---|---|---|---|
| Ester Mixture: | | | |
|   Polyester PE-300 | 100 | Styrene Sclution of Unsaturated Polyester resin. | Reactive base. |
|   Titanium Dioxide | 12.45 | Titanium dioxide | White pigment. |
|   Bentone 27 | 2.41 | Quaternary ammonium bentonite | Thixotropic agent. |
|   Nuosperse 627 | 0.12 | | Dispersing agent. |
|   Methyl Alcohol | 0.12 | Methyl alcohol | Used to wet Bentone 27. |
|   Cobalt naphthenate 6% Cobalt Metal. | 1.0 | Cobalt naphthenate | Accelerator. |
| Initiator (This composition is fairly stable until the initiator is added): Methyl ethyl ketone peroxide No. 60. | 0.5 | Solution of Methylethyl ketone peroxide 60% active. | |

TABLE II.—COMPOSITION OF HEXAMETHOXYMETHYLMELAMINE: EPOXY RESIN FILM

| Ingredient | Parts by Weight | Nature | Function |
|---|---|---|---|
| Titanium Dioxide | 13.46 | Titanium dioxide | White Pigment. |
| Epon 1007 (Shell Oil Co.) | 11.44 | Essentially a high molecular weight diepoxide prepared from bisphenol-A and epichlorohydrin. | Resinous base. |
| Cymel 300 (Am. Cyanamid Co.) | 2.0 | Hexamethoxymethylmelamine | Co-reactant. |
| Catalyst 1010 (Am. Cyanamid Co.) | 0.15 | Proprietary | Catalyst. |
| Solvents | 10.0 | Mixed aromatics and ketones | Solvent. |

TABLE III.—COMPOSITION OF PHENOL FORMALDEHYDE: EPOXY RESIN FILM

| Ingredient | Parts by Weight | Nature | Function |
|---|---|---|---|
| Titanium Dioxide | 13.46 | Titanium dioxide | White pigment. |
| Epon 1007 | 10.10 | See Table II | Reactive resinous base. |
| Methylon 75108 (General Electric Co.) | 3.36 | Essentially a mixture of the allyl ethers of mono, di, and tri, methylol phenols; the last predominating. | Co-reactant. |
| Phosphoric acid | 0.45 | $H_3PO_4$ | Catalyst. |
| Solvents | 7.0 | Mixed aromatics and ketones | Solvent. |

TABLE IV.—COMPOSITION OF EPOXY DICYANDIAMIDE RESIN FILM

| Ingredient | Parts by Weight | Nature | Function |
|---|---|---|---|
| Epon 828 (Shell Oil Co.) | 17.2 | Diglycidyl ether of bisphenol-A | Resinous base. |
| Epon 830 (Shell Oil Co.) | 10.8 | Slightly higher molecular weight of above | Resinous base. |
| Titanium Dioxide | 23.9 | Titanium dioxide | White pigment. |
| Mistrom HGO 75 | 4 | Talc (Magnesium Silicate) | Inert pigment. |
| Bentone 38 | 4 | Quaternary ammonium bentonite | Thixotropic agent. |
| Lamp Black | 0.08 | Lamp Black (carbon) | Black pigment. |
| 20% solution of dicyandiamide in dimethylformamide (guanidine-1 cyano). | 8.4 | | Crystalline curing agent in solution.[1] |

[1] Actually dicyandiamide decomposes into products which cure the Epoxy Resin.

TABLE V.—COMPOSITION OF EPOXY BORONTRIFLUORIDE RESIN FILM

| Ingredient | Parts by Weight | Nature | Function |
|---|---|---|---|
| Epon 828 | 13.0 | Diglycidyl ether of bisphenol-A | Resinous base. |
| Epon 830 | 22.8 | Slightly higher molecular weight of above | Resinous base. |
| Titanium dioxide | 18.1 | Titanium dioxide | White pigment. |
| Mistrom HGO 75 | 3.2 | Talc (Magnesium Silicate) | Inert Pigment. |
| Bentone 38 | 3.2 | Quaternary ammonium bentonite | Thixotropic agent. |
| Lamp Black | 0.06 | Lamp Black (carbon) | Black pigment. |
| Epon curing agent BF 3-400 | 1.8 | Borontrifluoride monoethylamine | Curing agent.[1] |

[1] Actually $BF_3:NH_2CH_2CH_3$ dissociates forming BF and $C_2H_5NH_2$, both of which cure the Epoxy Resin (predominating reaction in $BF_3$ Epoxy.)

TABLE VI.—COMPOSITION OF EPOXY ISOCYANATE FILM

| Ingredient | Parts by Weight | Nature | Function |
|---|---|---|---|
| Titanium Dioxide | 13.46 | Titanium dioxide | White pigment. |
| Epon 1007 | 6.07 | See Tables II and III | Reactive Resinous base. |
| Mondur S (Mobay) | 7.35 | Phenol blocked isocyanate prepolymer | Co-reactive Resinous base. |
| Solvents | 12.92 | Mixed aromatics ketones and esters | Solvent. |

TABLE VII.—COMPOSITION OF PLASTISOL FILM

| Ingredient | Parts by Weight | Nature | Function |
|---|---|---|---|
| QYKV-2 (Union Carbide) | 46.5 | High molecular weight 100% Polyvinyl chloride resin plastisol grade. | Resin. |
| Flexol Plasticizer DOP | 34.9 | Di-(2-ethylhexyl)phthalate | Plasticizer. |
| Titanium Dioxide | 9.3 | Titanium dioxide | White pigment. |
| Aroflint system 505 Component 303 x 90 (Archer Daniels Midland Company). | 9.3 | Epoxidized/soya oil 90% in xylene | Stabilizer. |
| Cabosil M-5 | 1.0 | Colloidal silica | Thixotropic agent. |

I claim:
1. The process of curing a resin which can only be cured at elevated temperatures and which cures at faster rates at elevated temperatures than at room temperature comprising bringing the resin into intimate embedded contact with a finely divided, heated, solid chemically inert material.

2. The process of curing a resin which cures at room temperature but which cures at a faster rate at elevated temperatures comprising bringing the resin into intimate embedded contact with a finely divided, heated, solid chemically inert material.

3. The process of curing a resin, which resin cures only at elevated temperatures, comprising bringing the resin into intimate embedded contact with a finely divided, heated, solid chemically inert material.

4. In the process of curing a resin, which resin cures by means of a reactive reagent which is released at an elevated temperature, comprising bringing said resin into intimate embedded contact with a finely divided, heated, solid chemically inert material.

5. The process of curing a resin system, said resin system comprising a mixture wherein a physical change takes place only at an elevated temperature, causing the resin to cure, comprising bringing the resin system into intimate embedded contact with a finely divided, heated, solid chemically inert material.

6. The process of claim 1 wherein the finely divided material is heated to a temperature of at least 200° F.

7. The process of claim 1 wherein the finely divided solid material is sand.

8. The process of claim 1 wherein the finely divided solid material is heated glass reflective beads, which beads are only partially imbedded in the resin.

9. The process of making a molded article utilizing a resin which can only be cured at elevated temperatures and which cures at a faster rate at elevated temperatures than at room temperature comprising at least partially filling a mold with a finely divided, heated, solid chemically inert material and filling the remaining portion of said mold with said resin.

10. The process of making a molded article utilizing a liquid resin which can only be cured at elevated temperatures and which cures at a faster rate at elevated temperatures than at room temperatures comprising at least partially filling a mold with said resin and then depositing on top of said resin and embedding therein a finely divided, heated, solid chemically inert material.

11. The process of making a coated panel comprising applying to said panel a thin coating of a resin which cures only at elevated temperatures and which cures at a faster rate at elevated temperatures than at room temperature, and applying to the surface of said coated panel a finely divided, heated, solid chemically inert material.

12. The process of claim 11 wherein said material is sand.

References Cited by the Examiner

UNITED STATES PATENTS

| | | | |
|---|---|---|---|
| 2,554,356 | 5/1951 | Beare | 264—317 |
| 2,638,523 | 5/1953 | Rubin | 264—259 XR |
| 2,847,391 | 8/1958 | Wheeler. | |
| 2,948,201 | 8/1960 | Nagin et al. | |
| 2,948,930 | 8/1960 | Herbst | 264—128 XR |
| 3,072,968 | 1/1963 | Watson et al. | 264—347 XR |

ALEXANDER H. BRODMERKEL, *Primary Examiner.*

P. E. ANDERSON, *Assistant Examiner.*

Notice of Adverse Decision in Interference

In Interference No. 95,959 involving Patent No. 3,281,515, R. D. Schmitz, RESIN CURING, final judgment adverse to the patentee was rendered July 8, 1968, as to claims 1–3, 5, 6, 7, and 8.

[*Official Gazette September 24, 1968.*]